United States Patent [19]
Aldridge et al.

[11] Patent Number: 6,047,047
[45] Date of Patent: Apr. 4, 2000

[54] TELECOMMUNICATION CONFIGURATIONS FOR TRANSCEIVING E-MAIL AND METHODS OF USING SAME

[75] Inventors: Timothy W. Aldridge, Midvale; Rich Erekson, Roy, both of Utah

[73] Assignee: 3Com Corporation, Santa Clara, Calif.

[21] Appl. No.: 09/069,421

[22] Filed: Apr. 29, 1998

[51] Int. Cl.$^7$ .................................................. H04M 11/00
[52] U.S. Cl. ..................... 379/93.24; 379/90.01; 379/110.01
[58] Field of Search ............................. 379/90.01, 93.01, 379/93.05–93.08, 93.14–93.27, 93.37, 110.01; 455/556, 557

[56] References Cited

U.S. PATENT DOCUMENTS

| | | |
|---|---|---|
| 5,497,339 | 3/1996 | Bernard . |
| 5,799,068 | 8/1998 | Kikinis et al. ........................ 379/93.06 |
| 5,859,628 | 1/1999 | Ross et al. . |

*Primary Examiner*—Wing F. Chan
*Attorney, Agent, or Firm*—Workman, Nydegger & Seeley

[57] ABSTRACT

A telecommunications device for transmitting or receiving E-mail across telephone lines without requiring the use of a conventional computer or a service provider for access to an E-mail account is provided. In a preferred embodiment, at the transmission location, the telecommunications device receives a message at a communications port from a personal data assistant device by an infrared link. Thereafter, the message is coupled to a modem circuit for modulation over the telephone line. The E-mail is routed to a reception location according to a phone number and, upon arrival at the reception location, is routed to or answered by another telecommunications device by means of an identifier emplaced in the caller identification packet. Acknowledgment indicators are also provided to display a status of the message. In another preferred embodiment, the message is input directly into the telecommunications device by means of a graffiti screen integrated therein. The telecommunications device may be integrated into or isolated from an existing telephone. In another embodiment, the telecommunications device may be a bi-directional pager.

15 Claims, 2 Drawing Sheets

TELECOMMUNICATION CONFIGURATIONS FOR TRANSCEIVING E-MAIL AND METHODS OF USING SAME

BACKGROUND OF THE INVENTION

1. The Field of the Invention

The present invention relates generally to the transmission and reception of E-mail. More specifically, the present invention relates to systems and methods for exchanging E-mail between telecommunication configurations.

2. The Relevant Technology

In general, electronic mail, or E-mail, provides a message transfer and storage service for the nodes on a network, internetwork or a stand-alone machine by way of a dial-up service or Internet provider. Initial E-mail systems were mainly small-scale and departmental, but E-mail systems of today are sophisticated and ubiquitous. Increasing bandwidth, encryption capabilities and support for video, audio and graphics are just some of the expected developments which are causing a rapid proliferation in present E-mail design and usage.

Although many service providers are presently available to users for furnishing E-mail accounts and various support services, some common steps are performed by users in a typical transmission or reception of E-mail regardless of their chosen service provider. For example, a user boots-up a desktop or portable computer, accesses the service provider through some software application and either retrieves a message or sends a message to another user, or both, as part of their E-mail account.

Transceiving of E-mail in this manner, however, has several shortcomings. One shortcoming is economic expense because a user is required to have some sort of computer which can cost several thousands of dollars for even basic configurations. For a user who merely desires to transmit or receive E-mail, this can be quite costly. Moreover, a user must disburse other monetary payments, typically monthly, for simply having access to E-mail from their service provider.

Another shortcoming is the unreasonable amount of time wasted to simply read or send an E-mail. An example of this occurs when a user desires to check whether or not they have received any E-mail. Not only is time expended during the boot-up period of the computer, but time is expended during the opening of the software application used to access the service provider. Perhaps not a problem if a user is already accessed to a provider, but a user can sometimes expend 15–20 minutes trying to open their E-mail account. Time problems are even further compounded because of unreliable service caused by system congestion, downtime or other malfunctions. Not infrequently, users sometimes cannot gain access to their E-mail accounts for hours.

Recently, other computing system configurations have been used in drafting a message that is eventually E-mailed to another user. One example of this is a personal data assistant, commonly known as a PDA. With PDA's, however, a user must still have access to a computer for transmission of an E-mail because PDA's typically cannot store enough software to access a service provider and/or cannot transmit or receive directly over a communications line such as a phone line. Again, excessive time and expense are expended with computers during transceiving of E-mail.

Another example of a device configured for E-mail is a pager. Disadvantageously, pagers are only uni-directional with respect to E-mail and cannot draft or send out E-mail messages.

Still other examples of devices configured for transceiving E-mail include telephones with attached display screens, such as Nortel's JAVA phone. With these devices, however, a user is still required to pay and access E-mail services from various providers. As before, access from a provider can be costly and time consuming. Moreover, these phone/E-mail devices are often as expensive as an inexpensive computer. As such, users are not only saddled with tremendous expensive when purchasing these devices but have the additional burden of having to choose between their existing telephones and a phone/E-mail configuration.

Existing phone/E-mail configurations are additionally problematic because they are presently incompatible with other computing system configurations, such as PDA's. This severely limits their present usefulness and potentially causes future difficulties as various systems and configurations are adapted for use with one another. Since longevity of computing configurations is fleeting in this age of rapidly developing configurations, economic waste also results when a user is forced to get rid of a configuration because of its inability to adapt to other computer configurations. Another particular limitation with the Nortel JAVA phone is that the phone is limited to applications created in the JAVA programming language.

Accordingly, it is desirous to find alternative systems and methods for quickly, inexpensively and effectively transceiving E-mail and to provide compatibility with existing configurations and robustness for future adaptability.

OBJECTS AND SUMMARY OF THE INVENTION

It is, therefore, an object of the present invention to provide improved systems and methods for transceiving E-mail.

It is another object of the present invention to provide systems and methods for transceiving E-mail without reliance upon existing computers.

It is still another object of the present invention to provide systems and methods for transceiving E-mail without reliance upon a service provider.

It is yet another object of the present invention to provide systems and methods for transceiving E-mail that is compatible with existing computing configurations.

It is still yet another object of the present invention to provide economically inexpensive systems and methods for transceiving E-mail.

It is a further object of the present invention to provide systems and methods for transceiving E-mail in a faster manner than can be performed with conventional systems.

It is an even further object of the present invention to provide robust systems and methods for transceiving E-mail having potential for adaptation to future configurations.

In accordance with the invention as embodied and broadly described herein, the foregoing and other objectives are achieved by providing a telecommunications device for transmitting or receiving E-mail across telephone lines without requiring the use of a conventional computer or a service provider for access to an E-mail account.

In a preferred embodiment, at the transmission location, the telecommunications device receives a message at a communications port from a personal data assistant device by an infrared link. Thereafter, the message is coupled to a modem circuit for modulation over the telephone line. The E-mail is routed to a reception location according to a phone number and, upon arrival at the reception location, is routed to or answered by the telecommunications device by means of an identifier emplaced in the caller identification packet. Acknowledgment indicators are also provided to display a status of the message, such as transmit, receive or message.

In another preferred embodiment, the message is input directly into the telecommunications device by means of a graffiti screen integrated therein. In general, the telecommunications device may be integrated into or isolated from an existing telephone.

In another embodiment, the telecommunications device may be a bi-directional pager coupled to a telephone line by means of a telephone configured to slidingly receive the pager.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

The present invention relates generally to transceiving, i.e., transmitting and receiving, E-mail with a telecommunications configuration. It is a feature of the present invention to provide a forum for the exchange of E-mail across ubiquitous telephone lines without requiring the use of a conventional computer or a service provider providing access to an E-mail account.

As used herein, "electronic mail" or "E-mail" refers to a message, such as an alphanumeric message, video, audio or graphic message, input by a user for transfer between at least two locations. Typically, the message will be converted into a data stream for convenient transmission across a telecommunications path, such as a telephone line like a copper wire, fiber optic cable or wireless network.

Figure 1:
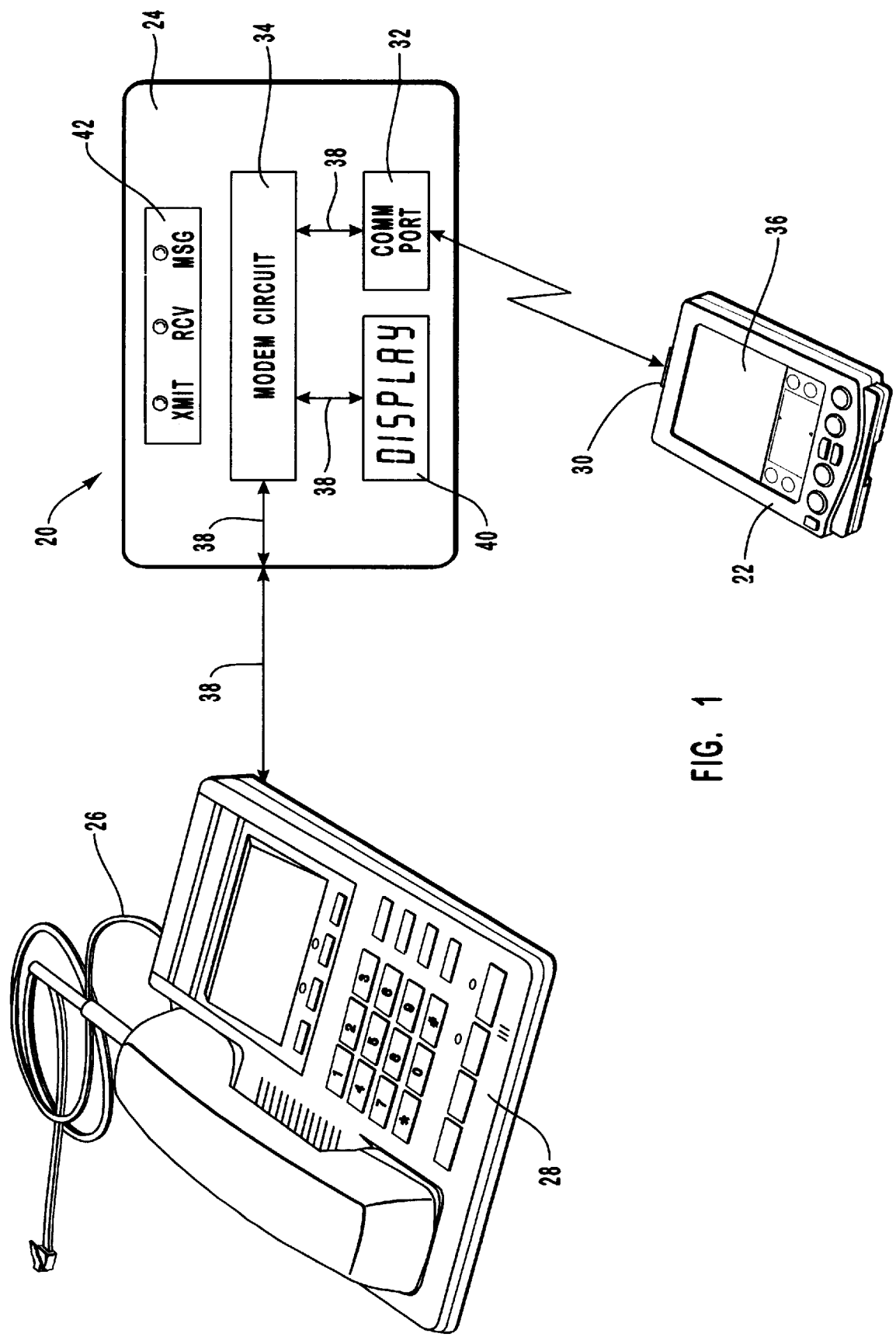
FIG. 1 is a diagram of a telecommunications configuration suitable for transceiving E-mail in accordance with the present invention.

With reference to FIG. 1, a system for transmitting or receiving an E-mail in accordance with the present invention is depicted generally as 20. For transmission of an E-mail, an E-mail is input by a user as a message into a computing configuration 22. It should be appreciated, however, that although the computing configuration 22 has components therein typically associated with computers, such as microprocessors, the computing configuration is other than a conventional computer like a general or special purpose computer. This is to prevent the excessively long time required for computer boot-up and for the opening of the applicational software utilized by the computer. Accordingly, computing configuration 22 is exemplified by devices such as a personal data assistant device, a variety of hand-held devices, multi-processor systems and microprocessor-based or programmable consumer electronics or any other computing configuration capable of having a message input therein. One preferred computing configuration easily adapted for use herein is a personal data assistant such as the Palm Pilot by 3 Com Corp.

Once the message is input into the computing configuration 22, the message is coupled to a telecommunications device 24. This telecommunications device, is ultimately electrically coupled to a telecommunications path, such as a telephone line 26, for transmission of the message to a reception location. Although not shown, the reception location is a system substantially similar to the system 20 depicted from which one skilled in the art can infer. In general, the coupling of the telecommunications device 24 to the telecommunications path can be direct or may be by way of a conventional telephone 28, which in turn, is electrically coupled to the telephone line 26. The telecommunications device may also be isolated from the telephone, as depicted in FIG. 1, or may be fully or partially integrated into the telephone 28. If isolated, suitable mechanical fasteners for attachment to a wall, for example, may be provided.

The coupling of the message from the computing configuration 22 to the telecommunications device 24 is preferably by way of two compatible communications ports, one per each of the respective devices. For example, with a personal data assistant (PDA) device as the computing configuration, often an infrared communications port 30 is configured therein for the serial transmission of data as is well known. At the telecommunications device 24, a corresponding or second infrared communications port 32 is for the reception of the message from the PDA. Yet, other communications ports are contemplated as within the scope of this invention and include transmission/reception ports for transmitting messages by RF or by a direct connection. These other ports are well known and are not described herein in detail.

Thereafter, once the message is received by the telecommunications device 24, the message is supplied to a modem circuit 34 for modulation of the message over the telecommunications path.

At the reception location, the reverse is performed. Specifically, the message is received and demodulated by a second modem circuit, similar to modem circuit 34. Then, the message is coupled to a second communications port, i.e., communications port 32, and transmitted back to a second computing configuration for display on some display screen like display screen 36. Since the system 20 depicted in FIG. 1, may either transmit or receive an E-mail, the coupling of the message as between components and devices is indicated by bi-directional communication lines 38.

An alternative embodiment for receiving input and display of a message, is also illustrated in FIG. 1, as screen 40. Thus, it should be appreciated that the telecommunications device 24 may either receive a message from a user by means of an isolated computing configuration 22 or from a user by means of a screen 40 integrated directly into the telecommunications device. If the message is input into screen 40, appropriate circuitry and routing is configured into the telecommunications device to couple the message back and forth between the screen 40 and the modem circuit 34 as indicated by bi-directional communication line 38. The screen 40 is preferably a graffiti screen, well known in the art, that enables a user to simply inscribe a message onto a surface of the screen for transmission to the reception location.

The transmission of the message over the telecommunications path, i.e., telephone line 26, is different than conventional E-mail transmission and reception and does not require the use of a service provider providing access to an E-mail account. With system 20, the E-mail address is identified and routed to the reception location according to the phone number called. At the reception location, the message is routed to the telecommunications device by an identifier placed in the caller identification (ID) portion. Thus, when a user at one location desires to send an E-mail to another location, the user dials or addresses the E-mail with the phone number of the telecommunications device. Then, when received by the another location, the E-mail is answered by the telecommunications device because of the identification embedded in the caller ID portion, similar to the manner in which a fax machine answers a telephone ring.

It can be appreciated that several PDAs can tranceive e-mail with a single said device 24 or 52. Each PDA will have a unique ID or e-mail address which is captured by said device 24 or 52. In this matter the embedded e-mail identification address is translated and used by the telephone network to transceive e-mail messages to the appropriate end device such that several PDAs can share a single transceiver device 24 or 52. It can also be appreciated that a single PDA can contain several embedded e-mail identifiers such that several individuals can share a single PDA and tranceive e-mail specifically for their application via a transceiver device 24 or 52 which is capable of capturing multiple embedded e-mail address.

No matter whether the message is input into a computing configuration 22 or into screen 40, the telecommunications device 24 is preferably equipped with an acknowledgment indicator 42 that displays a status of the message, i.e., whether the message has been transmitted, received or whether a message is awaiting.

A dedicated power supply (not shown) may additionally be configured into the telecommunications device for powering the circuitry therein. Alternatively, power may be acquired from the telephone or any other source.

A communications link may also be made with the foregoing system from a conventional computer having a service provider. For example, with conventional E-mail paging systems, a service provider converts a conventional E-mail into a format for broadcast over a communications path for reception by a pager. Then the user reads their E-mail message on a small display screen on their pager. In a similar manner, a service provider can convert E-mail sent from a conventional computer into a proper caller identification format to be answered by the telecommunications device. In this manner, advantage is made of a presently existing system, i.e., PSTN, by creating a WAN therefrom.

Further advantage is realized with the present invention because users will no longer be required to expend excessive capital to buy conventional computers, desktop or PC, to just send or receive simple E-mail. Moreover, excessive time will be saved in sending or reading E-mail because a conventional computer is no longer required to be boot-up. Time is also saved because there are no longer any user requirements to open applicational software on the computer. Additionally, a user is no longer required to expend capital for a service provider's access to an E-mail account. Although a user is required to pay for a phone bill, this is nothing beyond that which is already being paid when their computer is connected to a telephone line.

An even further advantage is realized with system 20 because data is conventionally coupled in a serial manner as between communication ports. Thus, so long as the telecommunications device is configured with a communications port having a traditional configuration, the system is robust and has extended its potential for adaptation to future configurations. In contrast, computers used simply for the exchange of E-mail are quickly outdated and require updating or replacement at excessive costs to a user.

Figure 2:
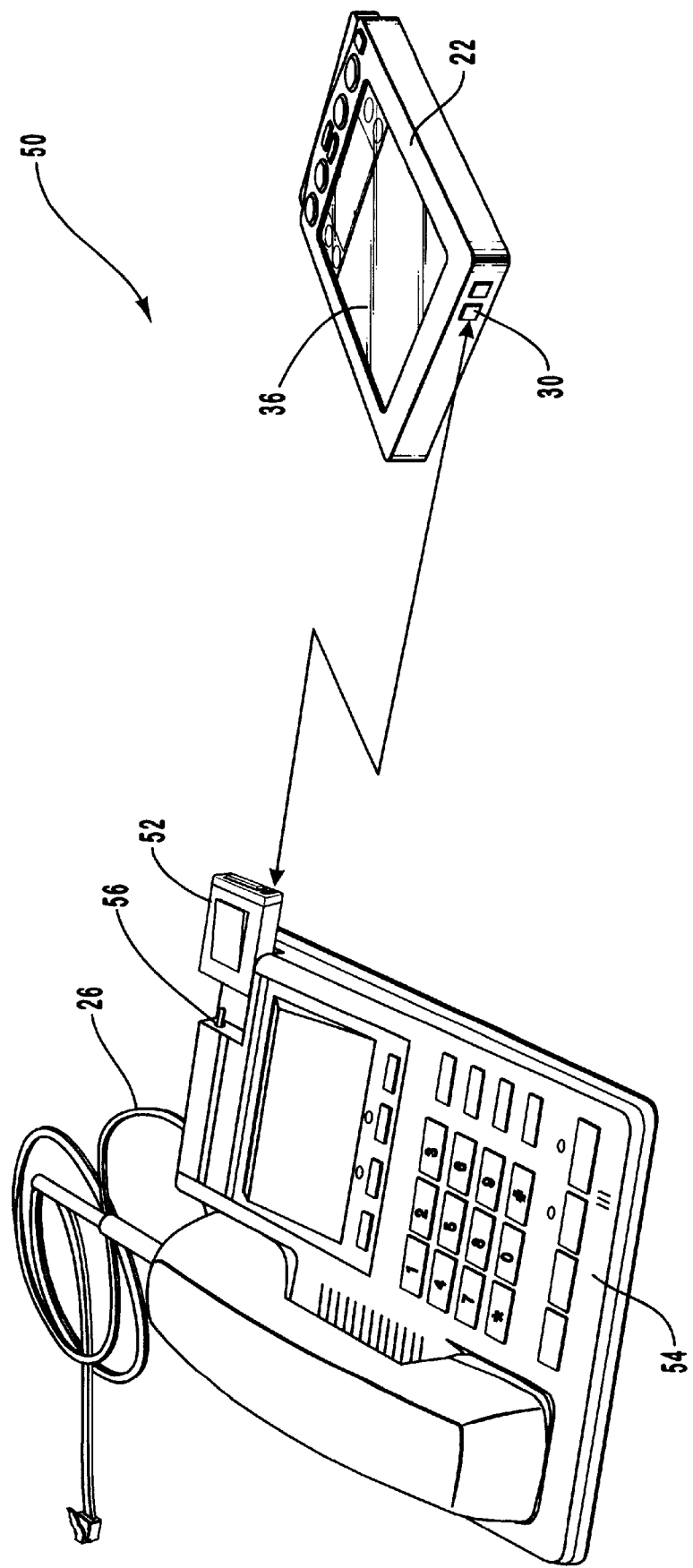
FIG. 2 is a diagram of an alternative configuration for use in transceiving E-mail adaptable for use with a telephone in accordance with another embodiment of the present invention.

With reference to FIG. 2, an alternative system for transmitting or receiving E-mail is depicted generally as 50. In this embodiment, a computing configuration 22 is still utilized to receive a message input from a user. Yet, instead of transmitting the message to a dedicated telecommunications device, the message can be transmitted to an existing configuration, a bi-directional pager 52. In this embodiment, the pager 52 is then coupled to a telephone line 26 by insertion into a telephone 54 slidingly adapted for reception of the pager at slot 56.

In this manner, another convenient way to send E-mail is achieved possessing all the advantages previously described. Moreover, this extends the capabilities of existing configurations which prevents excessive user costs from accumulating for the mere transmission and reception of E-mail.

With a bi-directional pager 52, an acknowledgment indicator is usually already incorporated that can display the status of a message. Such indicators are well known as part of "ack-back" or "acknowledgment back" pagers and, in general, inform the transmitter location that the message has been received by the pager.

What is claimed is:

1. A system for transmitting and receiving a message without a service provider providing access to an electronic mail account, comprising:
   a first computing configuration for having said message input therein, said message including a unique identifier associated therein for routing said message in a packet-based network environment;
   a first telecommunication device having,
      a first communications port for receiving said message from said first computing configuration; and
      a first modem circuit coupled to said first communications port for modulating said message over a connection-based telecommunications path; and
   a second telecommunication device having,
      a second modem circuit for demodulating said message from said telecommunications path; and
      a second communications port coupled to said second modem circuit for supplying said message to a second computing configuration via a packet-based identifier scheme using said unique identifier and for displaying said message when said second computing configuration corresponds to said unique identifier of said message.

2. A system according to claim 1, wherein said first or second telecommunication devices are integrated into a telephone.

3. A system according to claim 1, wherein said first or second communications port is a serial port.

4. A system according to claim 3, wherein said serial port is an infrared port.

5. A system according to claim 1, wherein said first telecommunication device further comprises an acknowledgment indicator that indicates when said message is received by said second telecommunication device.

6. A system according to claim 1, wherein said second telecommunication device further comprises an acknowledgment indicator that said message has been received by said second telecommunication device.

7. A system according to claim 1, wherein said first or second computing configurations is a personal data assistant device.

8. A system according to claim 1, wherein said telecommunications path is a phone line.

9. A system according to claim 1, wherein said first or second telecommunications devices is a bi-directional pager.

10. A system for transmitting and receiving a message from between two locations without a service provider providing either of said two locations access to an electronic mail account, comprising:

a first personal data assistant device for having said message input therein, said message including a unique identifier associated therein for routing said message in a packet-based network environment;

a first telecommunication device electrically coupled to a telephone line having,
        a first infrared reception port for receiving said message from a first infrared transmission port of said first personal data assistant device; and
        a first modem circuit coupled to said first infrared reception port for modulating said message over said telephone line; and a second telecommunication device electrically coupled to said telephone line having,
        a second modem circuit for demodulating said message from said telephone line; and
        a second infrared transmission port coupled to said second modem circuit for transmitting via a packet-based identifier scheme using said unique identifier said message to a second infrared reception port of a second personal data assistant device when said second personal data assistant device corresponds to said unique identifier of said message, said second personal data assistant device for displaying said message, said first personal data assistant device and telecommunication device being at one of said two locations and said second personal data assistant device and telecommunication device being at the other of said two locations.

11. A system according to claim 10, wherein said first and second telecommunication devices and said first and second personal data assistant devices further comprise an acknowledgment indicator for displaying a status of said message.

12. A system according to claim 11, wherein said first or second telecommunication devices are a bi-directional pager.

13. A method for transmitting or receiving a message over a telephone line without a service provider providing access to an electronic mail account, said message input into a first personal data assistant, comprising the steps of:

coupling said message including a unique identifier associated therein for routing said message in a packet-based network environment from, one of,
        a) a first communications port of said personal data assistant to a second communications port of a telecommunications device; and
        b) said second communications port of said telecommunications device to said first communications port of said personal data assistant;

supplying said message from, one of,
        c) said second communications port to a modem circuit of said telecommunication device; and
        d) said modem circuit to said second communications port; and, one of the following steps,
        e) modulating said message over said telephone line;
        f) demodulating said message from said telephone line; and
        g) transmitting said message to a second personal data assistant when said second personal data assistant corresponds with said unique identifier of said message.

14. The method according to claim 13, further comprising the step of displaying a status of said message on an acknowledgment indicator, said acknowledgment indicator being on one of said personal data assistant and said telecommunications device.

15. The method according to claim 13, wherein said step of coupling said message further comprises the step of transmitting or receiving said message by infrared means.

* * * * *